(12) United States Patent
Susko

(10) Patent No.: US 10,919,423 B2
(45) Date of Patent: Feb. 16, 2021

(54) ADJUSTABLE SEAT

(71) Applicant: Ford Global Technologies, LLC, Dearborn, MI (US)

(72) Inventor: Thomas J. Susko, Saint Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 16/180,402

(22) Filed: Nov. 5, 2018

(65) Prior Publication Data
US 2020/0139864 A1    May 7, 2020

(51) Int. Cl.
| | | |
|---|---|---|
| *B60N 2/66* | (2006.01) | |
| *B60N 2/90* | (2018.01) | |
| *A47C 7/14* | (2006.01) | |
| *A47C 7/46* | (2006.01) | |

(52) U.S. Cl.
CPC ............. *B60N 2/667* (2015.04); *A47C 7/14* (2013.01); *A47C 7/462* (2013.01); *B60N 2/986* (2018.02)

(58) Field of Classification Search
None
See application file for complete search history.

(56) References Cited

U.S. PATENT DOCUMENTS

| | | | | |
|---|---|---|---|---|
| 3,982,737 A | * | 9/1976 | Platt | A47C 7/287 267/102 |
| 4,309,058 A | * | 1/1982 | Barley | B60N 2/666 297/284.4 |
| 4,602,816 A | | 7/1986 | Chandler | |
| 4,938,529 A | * | 7/1990 | Fourrey | B60N 2/99 297/284.9 |
| 5,092,654 A | * | 3/1992 | Inaba | B60N 2/667 297/284.7 |
| 5,560,677 A | * | 10/1996 | Cykana | B60N 2/5825 297/218.3 |
| 5,651,584 A | * | 7/1997 | Chenot | B60N 2/66 297/284.4 |
| 5,806,910 A | | 9/1998 | Derees | |
| 5,902,011 A | | 5/1999 | Hand et al. | |
| 6,302,487 B1 | | 10/2001 | Fujita et al. | |
| 6,572,190 B2 | | 6/2003 | Koepke et al. | |
| 6,955,402 B2 | | 10/2005 | VanDeRiet et al. | |
| 2005/0104428 A1 | | 5/2005 | Walker et al. | |
| 2006/0250008 A1 | * | 11/2006 | Kohl | B60N 2/66 297/284.9 |
| 2009/0001783 A1 | * | 1/2009 | Hazlewood | B60N 2/5883 297/216.1 |
| 2011/0004371 A1 | * | 1/2011 | Bullard | B60N 2/6673 701/36 |
| 2011/0025109 A1 | | 2/2011 | Ryczek et al. | |
| 2013/0285426 A1 | * | 10/2013 | Arant | B60N 2/665 297/284.1 |
| 2016/0311352 A1 | * | 10/2016 | Kheil | B60N 2/5825 |

* cited by examiner

*Primary Examiner* — David R Dunn
*Assistant Examiner* — Christopher E Veraa
(74) *Attorney, Agent, or Firm* — David Coppiellie; Price Heneveld LLP

(57) ABSTRACT

A vehicle seat includes a fabric center portion, first and second bolsters, a first seam between the first bolster and the center portion, a second seam between the center portion and the second bolster, and a seat frame. First and second extension members are disposed along and coupled to the respective first and second seams. The first and second extension members are adjustable between first and second positions.

20 Claims, 13 Drawing Sheets

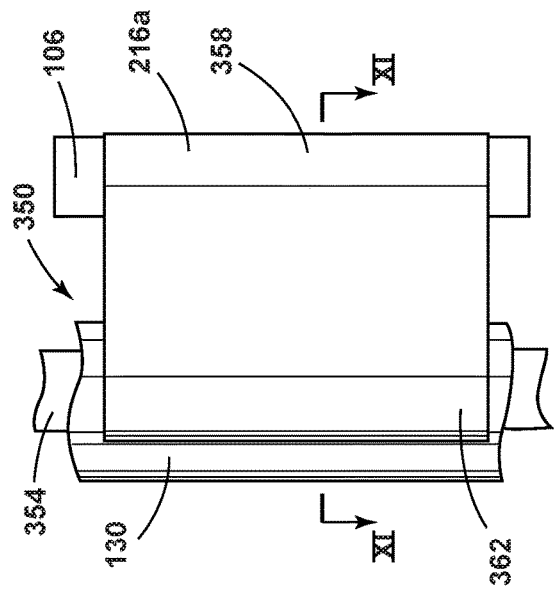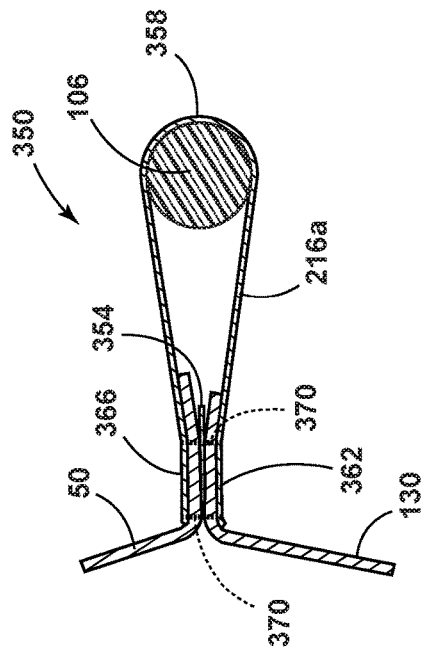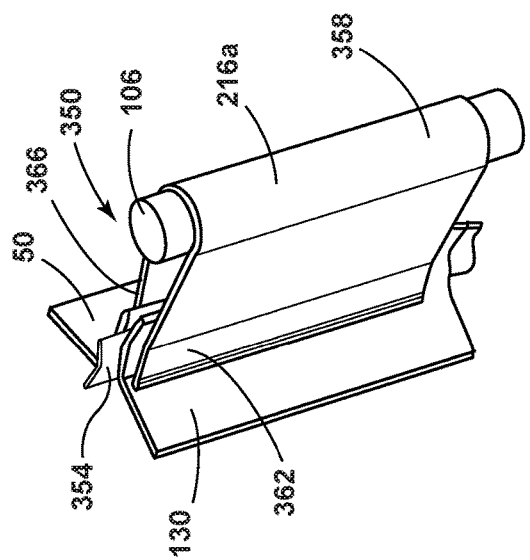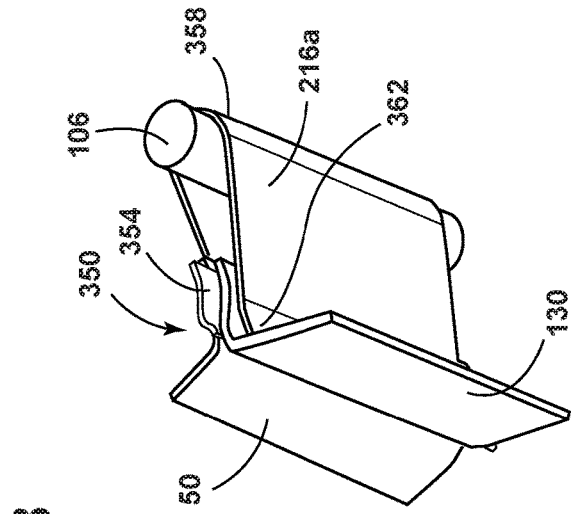
FIG. 8
FIG. 10
FIG. 11
FIG. 9

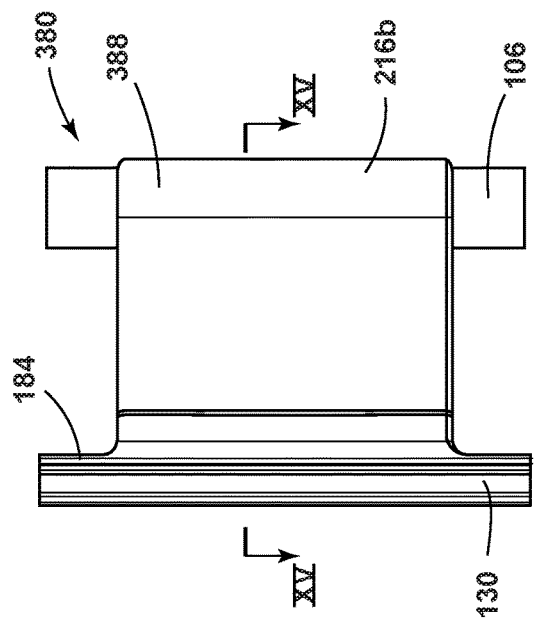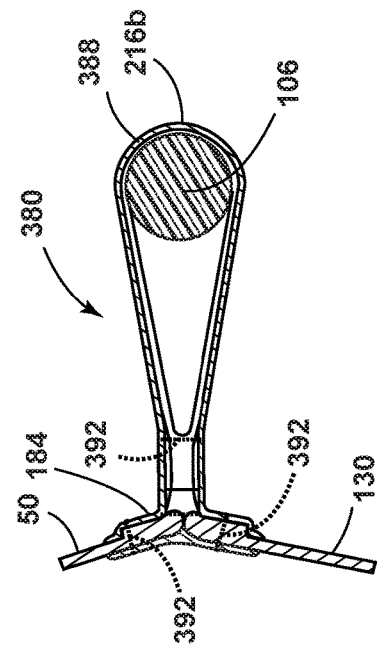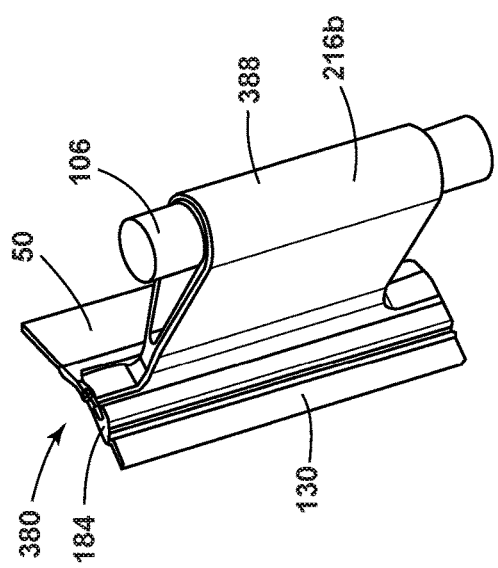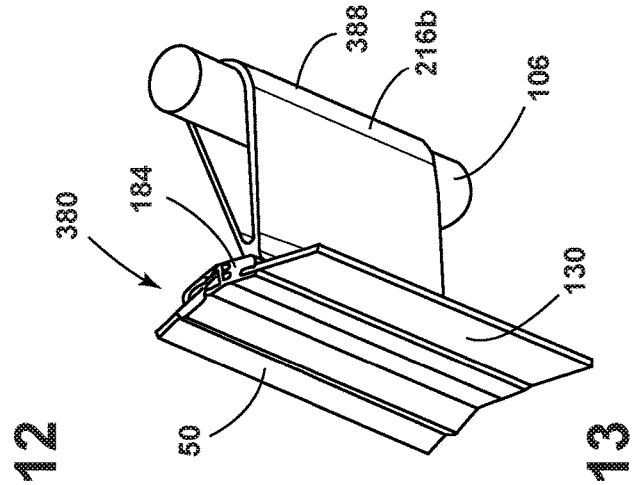
FIG. 12
FIG. 14
FIG. 13
FIG. 15

ADJUSTABLE SEAT

FIELD OF THE DISCLOSURE

The present disclosure generally relates to a vehicle seating assembly, and more particularly, to a vehicle seating assembly having adjustable seat bolsters.

BACKGROUND OF THE DISCLOSURE

Seat bolsters are generally configured to provide supplemental support to the shoulders, torso, and thighs of a vehicle passenger.

SUMMARY OF THE DISCLOSURE

According to a first aspect of the present disclosure, a vehicle seat includes a fabric center portion, first and second bolsters, a first seam between the first bolster and the center portion, a second seam between the center portion and the second bolster, and a seat frame. First and second extension members are disposed along and coupled to the respective first and second seams. The first and second extension members are adjustable between first and second positions.

Embodiments of the first aspect of the disclosure can include any one or a combination of the following features:
- a border area disposed within the seat frame and between the center portion and the seat frame;
- the first and second bolsters include respective first and second longitudinal panels;
- the first and second seams are disposed between the respective first and second longitudinal panels and the center portion;
- the first and second seams each include a pocket;
- each pocket of the first and second seams is slidably positioned along the respective first and second extension members;
- the first position of the first and second extension members includes an extended position;
- the second position of the first and second extension members includes a retracted position;
- the first and second extension members each include respective first and second anchor ends and the first and second anchor ends are attached to a first edge of the seat frame;
- the first and second extension members each include respective first and second adjustment ends and the first and second adjustment ends are attached to a second edge of the seat frame;
- the seat includes a seatback;
- the seat includes a seat bottom;
- the pocket is part of a sewn listing pocket assembly; and/or
- the pocket is part of an overmolded listing pocket assembly.

According to a second aspect of the present disclosure, a seat includes a fabric assembly that is secured to a seat frame. The fabric assembly includes a central portion. The first and second rods are secured to the seat frame and attached to opposing sides of the central portion. The first and second rods define first and second bolsters on opposing sides of the central portion.

Embodiments of the second aspect of the disclosure can include any one or a combination of the following features:
- first and second panels, wherein the first and second panels partially define first and second bolsters;
- the first panel is disposed between a first side of the border portion and a first side of the central portion;
- the second panel is disposed between a second side of the central portion and a second side of the border portion;
- the fabric assembly having first and second bolsters is disposed on one or more of a seatback frame and a seat bottom frame;
- the first and second rods include an adjustment mechanism;
- the adjustment mechanism is selectively operable to move the first and second rods between at least a first position and a second position;
- the first position is defined by a first rod length of the first and second rods;
- the second position is defined by a second rod length of the first and second rods;
- the second rod length is less than the first rod length; and/or
- the fabric assembly is subject to greater tension when the first and second rods are at the second rod length than when the first and second rods are at the first rod length.

According to a third aspect of the present disclosure, a vehicle seating assembly includes a seatback or a seat bottom having first and second supports and an adjustable member disposed between the first and second supports. The adjustable member is selectively adjustable between first and second positions to form a bolster between the adjustable member and the first or second support. A fabric assembly is disposed on the seatback or the seat bottom and coupled to the first and second supports and the adjustable member.

Embodiments of the third aspect of the disclosure can include any one or a combination of the following features:
- the adjustable member includes first and second listing rods;
- the bolster comprises first and second bolsters;
- the selective adjustment of the first listing rod between the first and second positions forms a first bolster in a respective first or second size; and/or
- the selective positioning of the second listing rod between the first and second positions forms a second bolster in a respective first or second size.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 8 is a first perspective view of a sewn listing pocket assembly;

FIG. 9 is a second perspective view of a sewn listing pocket assembly;

FIG. 10 is a side view of a sewn listing pocket assembly of FIG. 8;

FIG. 11 is a cross-sectional view taken along line XI-XI of FIG. 10 of a sewn listing pocket assembly;

FIG. 12 is a first perspective view of a molded listing pocket assembly;

FIG. 13 is a second perspective view of a molded listing pocket assembly of FIG. 12;

FIG. 14 is a side view of a molded listing pocket assembly of FIG. 12;

FIG. 15 is a cross-sectional view of a molded listing pocket assembly taken along line XV-XV of FIG. 14;

DETAILED DESCRIPTION OF THE PREFERRED EMBODIMENTS

Figure 1:
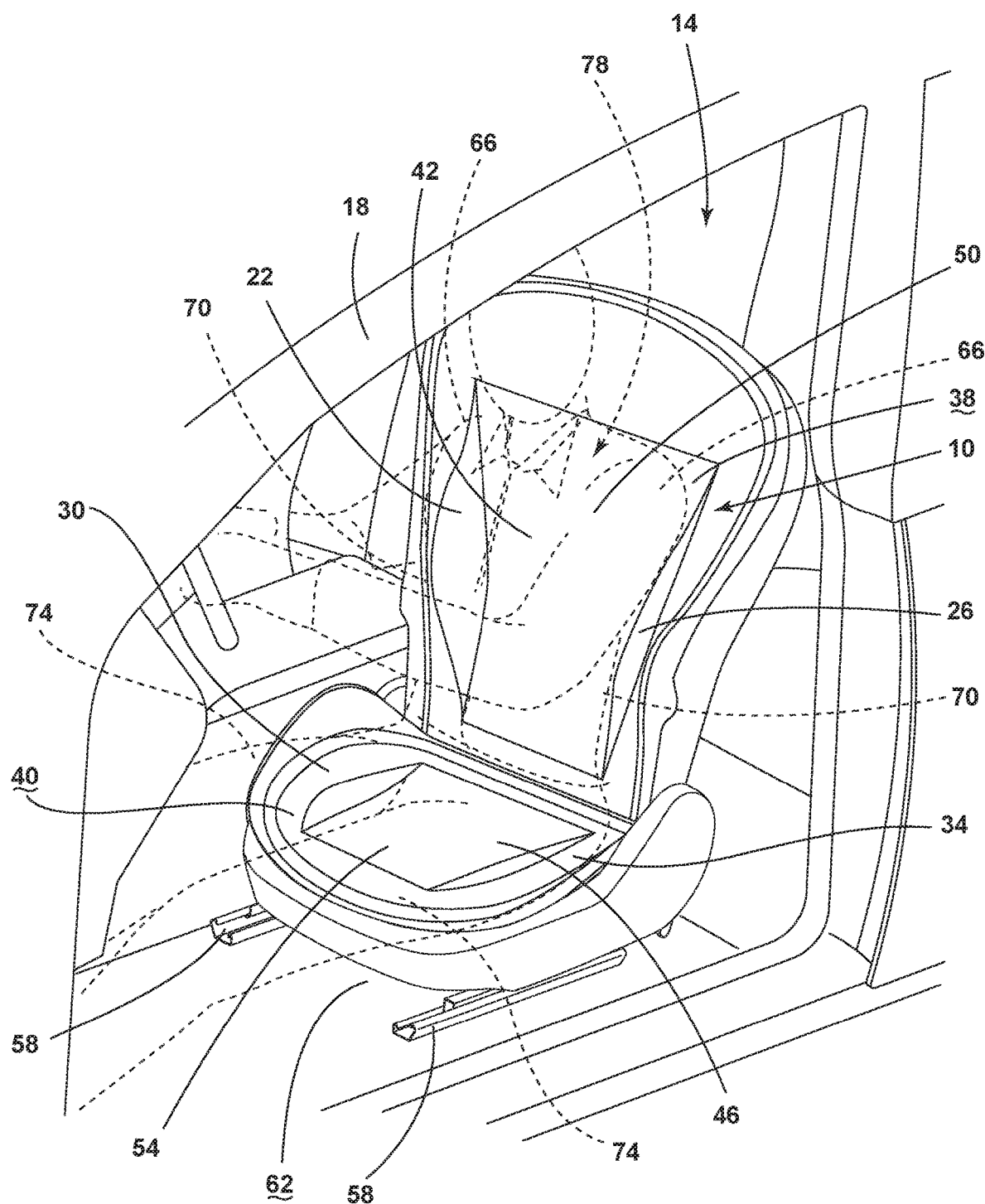
FIG. 1 is a perspective view of a vehicle seating assembly in a vehicle according to an aspect of the present disclosure.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a vehicle seating assembly 10 or seat is shown disposed in a cabin 14 of a vehicle 18. The vehicle seating assembly 10 may include selectively adjustable bolsters 22, 26, 30, 34 that enhance individual comfort during travel. Additionally, the vehicle seating assembly 10 may include a seating surface 38 made of a breathable, elastomeric material. The seating assembly 10 or seat may include a seatback 42 and a seat bottom 46. The seatback 42 may include a center portion 50 disposed between a first bolster 22 and a second bolster 26. The seat bottom 46 may include a center portion 54 disposed between a first bolster 30 and a second bolster 34. Extension members (not shown) may be disposed on the back side of the seatback 42 and the underside of the seat bottom 46. The extension members (not shown) may be adjustable to vary the size of the first and second seatback bolsters 22, 26 and the first and second seat bottom bolsters 30, 34. The seatback 42 may be rotationally coupled to the seat bottom 46. The seating assembly 10 may be disposed on rails 58 mounted along a floor 62 of the cabin 14. As such, the vehicle seating assembly 10 may provide adjustable lateral support to shoulder 66, torso 70, and thigh 74 areas of an individual 78.

Figure 2:
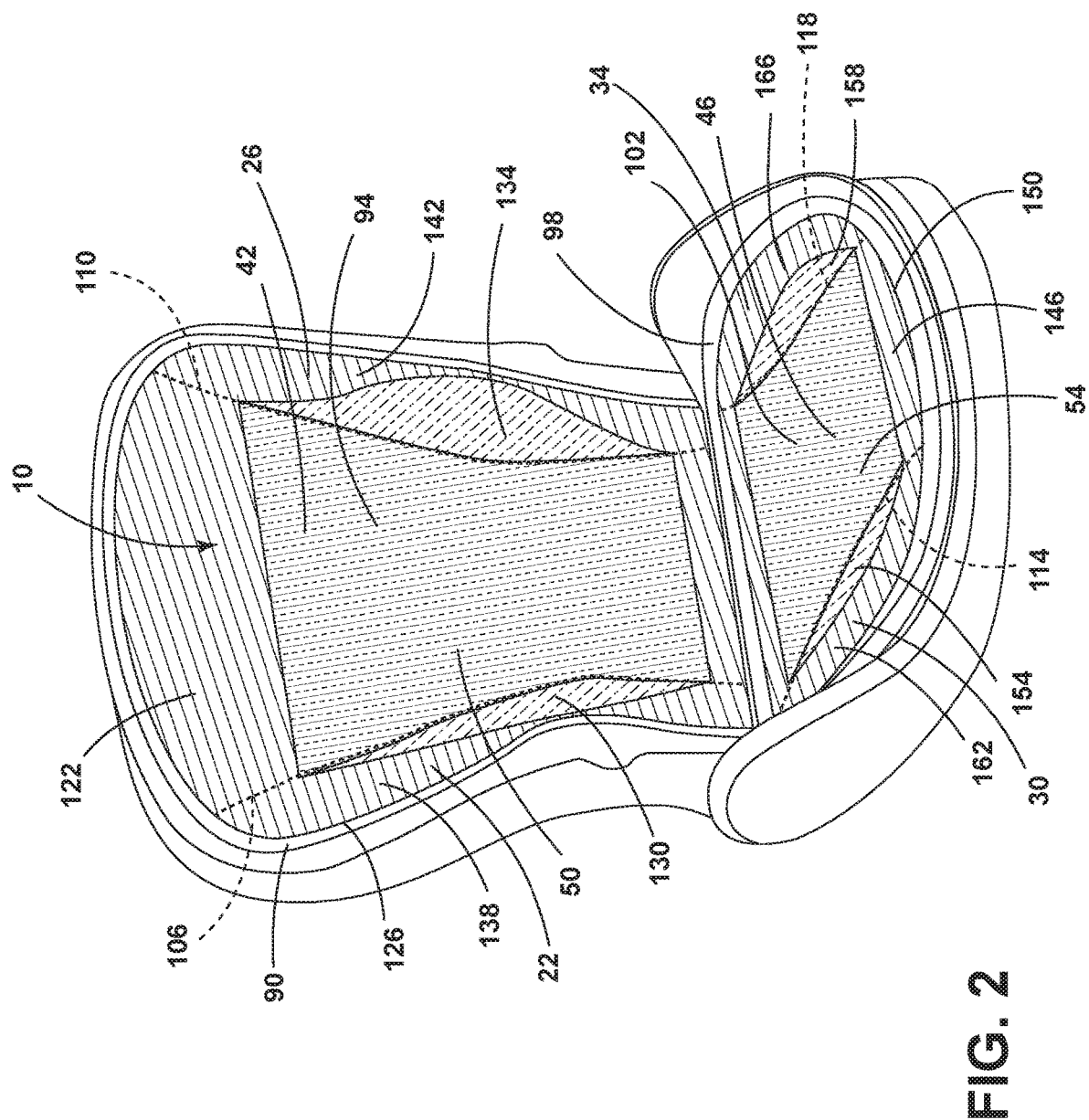
FIG. 2 is a front perspective view of the seating assembly of the present disclosure.

With reference to FIG. 2, the seating assembly 10 is shown outside of the vehicle 18. The seatback 42 may include a seatback frame 90 and a seatback fabric assembly 94. The seat bottom 46 may include a seat bottom frame 98 and a seat bottom fabric assembly 102. First and second seatback extension members are shown behind the seatback 42. In the depicted embodiment, the first and second seatback extension members are shown as first and second seatback rods 106, 110. First and second seat bottom extension members are shown beneath the seat bottom 46. In the depicted embodiment, the first and second seat bottom extension members are shown as first and second seat bottom rods 114, 118. The first seatback rod 106 may be referred to as the right seatback rod because it is on the right side of a seated individual. The second seatback rod 110 may be referred to as the left seatback rod because it is on the left side of a seated individual. Similarly, the first seat bottom rod 114 may be referred to as the right seat bottom rod because it is on the right side of a seated individual. The second seat bottom rod 118 may be referred to as the left seat bottom rod because it is on the left side of a seated individual.

With continued reference to FIG. 2, the seatback fabric assembly 94 and the seat bottom fabric assembly 102 may incorporate fabric sections that may define seating contours. The seatback fabric assembly 94 may include a seatback border area 122 proximate an inner perimeter 126 of the seatback frame 90, the seatback center portion 50, a first seatback longitudinal panel 130, and a second seatback longitudinal panel 134. The first seatback bolster 22 may include the first seatback longitudinal panel 130 and a first portion 138 of the seatback border area 122 adjacent to the first seatback longitudinal panel 130. The second seatback bolster 26 may include the second seatback longitudinal panel 134 and a second portion 142 of the seatback border area 122 adjacent to the second seatback longitudinal panel 134.

The seat bottom fabric assembly 102 may include a seat bottom border area 146 proximate an inner perimeter 150 of the seat bottom frame 98, the seat bottom center portion 54, a first seat bottom longitudinal panel 154, and a second seat bottom longitudinal panel 158. The first seat bottom bolster 30 may include the first seat bottom longitudinal panel 154 and a first portion 162 of the seat bottom border area 146 adjacent to the first seat bottom longitudinal panel 154. The second seat bottom bolster 34 may include the second seat bottom longitudinal panel 158 and a second portion 166 of the seat bottom border area 146 adjacent to the second seat bottom longitudinal panel 158.

With continued reference to FIG. 2, the areas of the seatback 42 may be referred to by their locations relative to a seated individual. The first seatback bolster 22 may be referred to as the right seatback bolster because it is on the right side of a seated individual. The second seatback bolster 26 may be referred to as the left seatback bolster because it is one the left side of a seated individual. The first seat bottom bolster 30 may be referred to as a right seat bottom bolster because it is on the right side of a seated individual. The second seat bottom bolster 34 may be referred to as a left seat bottom bolster because it is one the left side of a seated individual. Similarly, the first seatback longitudinal panel 130 may be referred to as a right seatback longitudinal panel because it is on the right side of a seated individual. The second seatback longitudinal panel 134 may be referred to as a left seatback longitudinal panel because it is on the left side of a seated individual. The first seat bottom longitudinal panel 154 may be referred to as a right seat bottom longitudinal panel because it is on the right side of a seated individual. The second seat bottom longitudinal panel 158 may be referred to as a left seat bottom longitudinal panel because it is on the left side of a seated individual. As such, the seatback 42 and seat bottom 46 areas may be described relative to a seated individual.

Figure 3:
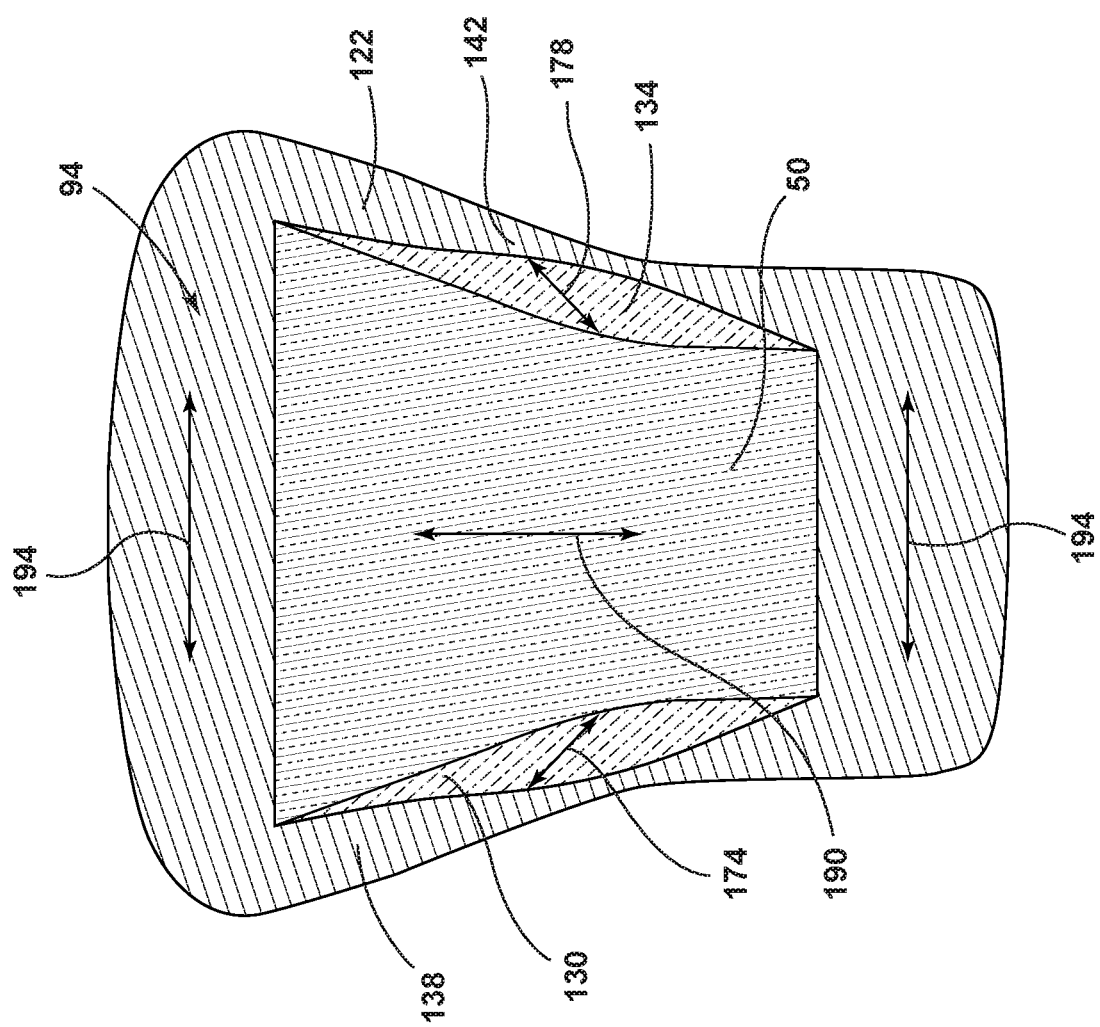
FIG. 3 is a schematic front view of the seatback fabric assembly.

With reference to FIG. 3, the seatback fabric sections may stretch in different directions to allow the seatback fabric assembly 94 to deform during adjustment of the first and second seatback rods 106, 110 and during occupancy. FIG. 3 shows seatback fabric assembly 94. Arrows 174, 178 depict the directions in which the first and second seatback longitudinal panels 130, 134 may stretch when the first and second seatback extension members are adjusted between a first position 182 (extended position) to a second position 186 (retracted position) to tension the first and second seatback longitudinal panels 130, 134 (see FIGS. 4A, 4B). The first and second seatback longitudinal panels 130, 134 may be subject to tension from the retraction of the first and second seatback rods 106, 110 (see FIGS. 4A and 4B). Arrow 190 shows the direction that the seatback center portion 50 may deform. Arrows 194 show the direction in which the seatback border area 122 may deform. As such, in various embodiments, the seatback fabric assembly 94 may include uni-directional and/or multi-directional fabric.

The seatback fabric may be a stretchable fabric incorporating elastomeric fibers. Also, the seatback fabric may be a mesh or other breathable material. The seatback fabric may incorporate contoured elastomeric fibers. Similarly, the seat bottom fabric assembly 102 may include uni-directional and/or multi-directional fabric. The seat bottom fabric may be a stretchable fabric incorporating elastomeric fibers. Also, the seat bottom fabric may be a mesh or other breathable material. The seat bottom fabric may incorporate contoured elastomeric fibers. As such, the seatback fabric assembly 94 and the seat bottom fabric assembly 102 may be designed to adjust to forces exerted on the seating assembly 10.

Figures 4A, 4B:
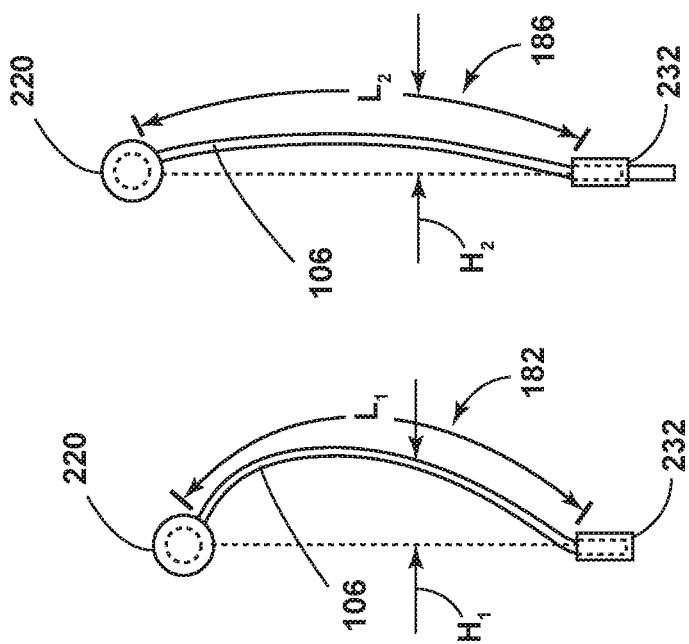
FIG. 4A is a schematic view of a seatback extension member in a first position.
FIG. 4B is a schematic view of a seatback extension member in a second position.
Figure 4:
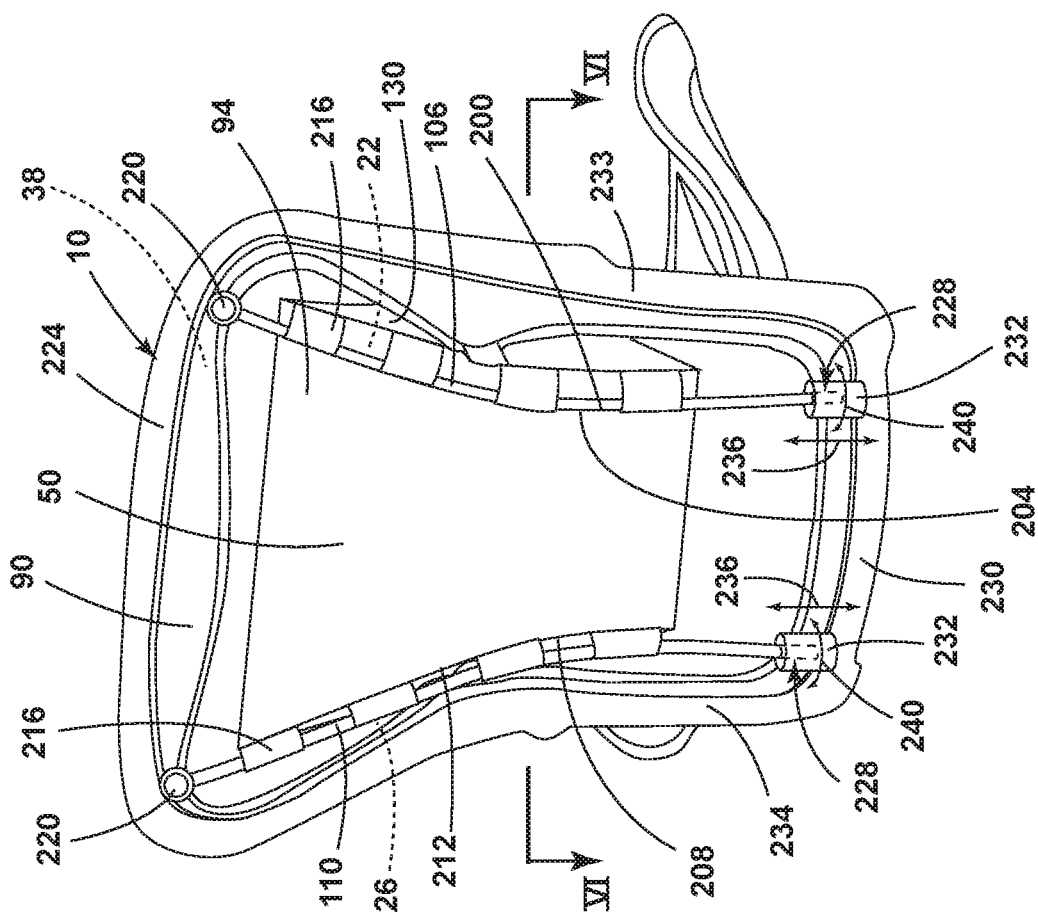
FIG. 4 is a back perspective view of the seating assembly of the present disclosure.

With reference to FIG. 4, a back perspective view of the seating assembly 10 is shown. The back perspective view shows the seatback fabric assembly 94 and the first and second seatback rods 106, 110. The first and second seatback rods 106, 110 may be coupled to the seatback fabric assembly 94. The first and second seatback rods 106, 110 are shown disposed on opposing sides of the seatback frame 90. The first and second seatback rods 106, 110 may be disposed on either side of the seatback center portion 50. A first seam 200 may connect the first seatback longitudinal panel 130 to a first side 204 of the seatback center portion 50. A second seam 208 may connect the second seatback longitudinal panel 134 (not shown) to a second side 212 of the seatback center portion 50. Pockets 216 may be secured to the first seam 200 and the second seam 208. The pockets 216 may be slidably coupled to the first and second seatback rods 106, 110.

With continued reference to FIG. 4, each of the first and second seatback rods 106, 110 may include an anchor end 220 or a fixed end that may be attached to a first edge 224 of the seatback frame 90. Each of the first and second seatback rods 106, 110 may include an adjustment end 228 or an adjustable end that may be attached to a second edge 230 of the seatback frame 90. The seatback frame 90 may also include a third edge 233 and a fourth edge 234. Adjustment mechanisms 232 may be disposed at the adjustment ends 228. The adjustment mechanisms 232 may include any of several types of manual or motorized adjustment mechanisms that may increase or decrease the arcs of the first and second seatback rods 106, 110, and thereby may adjust the shape of the first and second seatback bolsters 22, 26 and the seatback center portion 50 adjacent to the first and second seatback rods 106, 110. The arcs of the first and second seatback rods 106, 110 may be adjusted by adjusting their lengths (see, for example, length $L_1$ of a rod in the first position 182 (extended position) in FIG. 4A and length $L_2$ of a rod in the second position 186 (retracted position) in FIG. 4B). Thus, a decrease in the seatback rod length L between the anchor end 220 and the adjustment end 228 from $L_1$ (FIG. 4A, first or extended position 182) to $L_2$ (FIG. 4B, second or retracted position 186) may decrease the arc height of the seatback rod from $H_1$ (FIG. 4A, first or extended position 182) to $H_2$ (FIG. 4B, second or retracted position 186).

With continued reference to FIG. 4, in various embodiments, the pockets 216 may be listing pockets, and the first and second seatback rods 106, 110 may be listing rods. As such, the adjustment mechanisms 232 may provide for vertical movement (arrow 236) or rotational movement (arrow 240) that may increase or decrease the arc height H or length L in the first and second seatback listing rods 106, 110, and thus make the first and second seatback bolsters 22, 26 respectively less or more prominent.

With continuing reference to FIG. 4, the first and second seatback rods 106, 110 may impart tension on the seatback fabric assembly 94 through the listing pockets 216 and may pull the seatback fabric assembly 94 away from the seatback seating surface 38 and into the seatback 42 to provide the desired contour in the seatback seating surface 38. The tension that the first and second seatback rods 106, 110 may exert on the listing pockets 216 and the first and second seams 200, 208 may be changed with the adjustment mechanisms 232, thereby changing the contour of the seatback seating surface 38. In one embodiment, the first and second seatback rods 106, 110 may be round fiberglass listing rods. Other profiles and construction materials, however, may also be utilized. For example, flat or U-shaped seatback extension member profiles may be constructed from carbon fiber and epoxy resin. As such, the first and second seatback rods 106, 110 may allow for convenient alteration of the contour of the seatback seating surface 38 to meet individual needs.

Figure 5A:
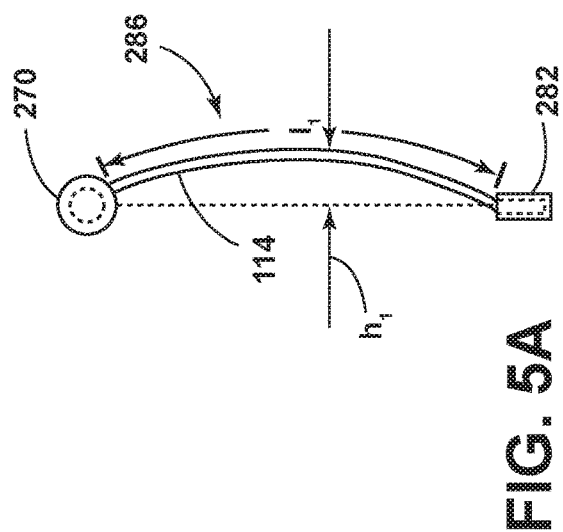
FIG. 5A is a schematic view of a seat bottom extension member in a first position.
Figure 5B:
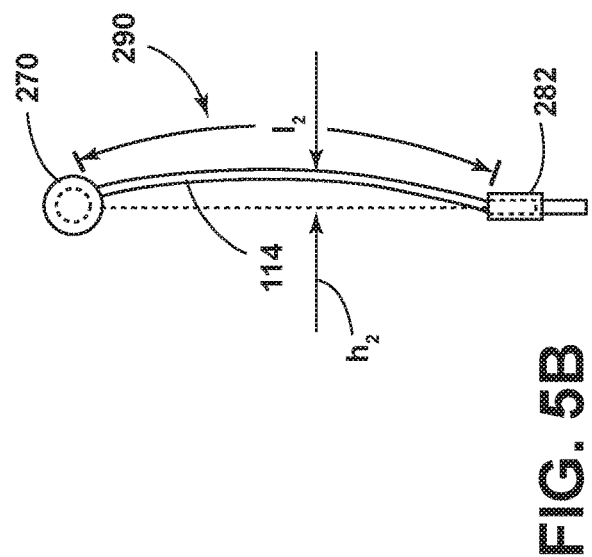
FIG. 5B is a schematic view of a seat bottom extension member in a second position.
Figure 5:
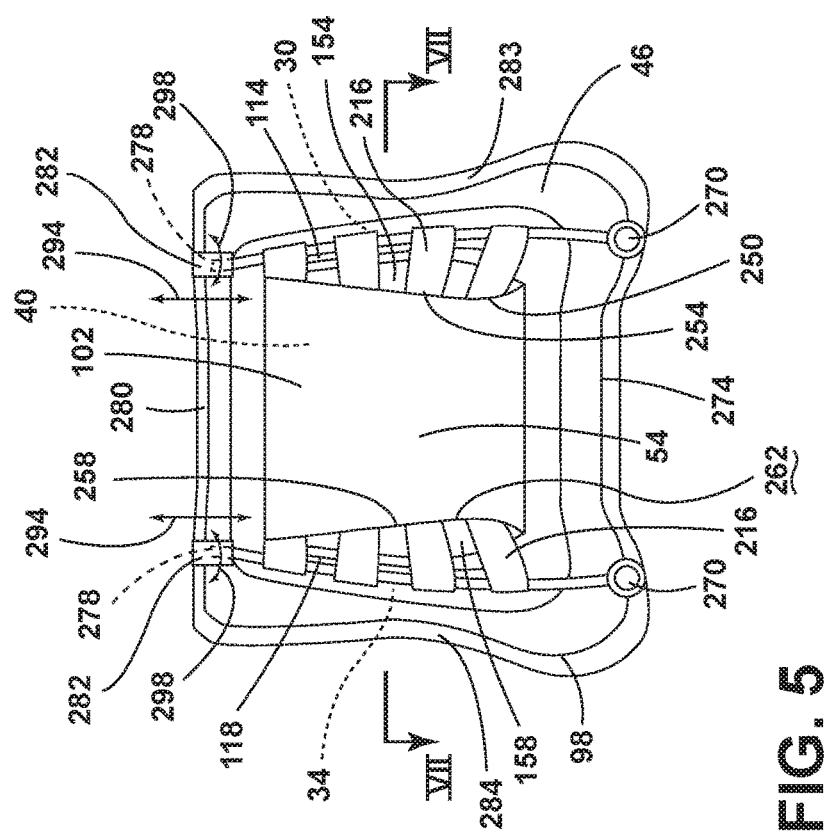
FIG. 5 is a bottom elevational view of the seat bottom of the present disclosure.

Referring to FIG. 5, a bottom elevational view of the seat bottom 46 is shown. The bottom elevational view shows the seat bottom fabric assembly 102 of the seat bottom 46 and the first and second seat bottom rods 114, 118 coupled to the seat bottom fabric assembly 102. The first and second seat bottom rods 114, 118 may be disposed below the seat bottom 46. A first seam 250 may connect the first seat bottom longitudinal panel 154 to a first side 254 of the seat bottom center portion 54. A second seam 258 may connect the second seat bottom longitudinal panel 158 to a second side 262 of the seat bottom center portion 54. The first and second seat bottom rods 114, 118 are shown disposed on opposing sides of the seat bottom frame 98. The adjustable first and second seat bottom rods 114, 118 may be disposed on either side of the seat bottom center portion 54 of the seat bottom fabric assembly 102. The pockets 216 may be secured to the first seam 250 and the second seam 258. The pockets 216 may be slidably coupled to the first and second seat bottom rods 114, 118.

With continued reference to FIG. 5, each of the first and second seat bottom rods 114, 118 may include an anchor end 270 or a fixed end that may be attached to a first edge 274 of the seat bottom frame 98. In the depicted embodiment, the knees of a seated individual are at the first edge 274. Each of the first and second seat bottom rods 114, 118 may include an adjustment end 278 or an adjustable end that may be attached to a second edge 280 of the seat bottom frame 98. In the depicted embodiment, the posterior of a seated individual is at the second edge 280. The seat bottom frame 98 may also include a third edge 283 and a fourth edge 284. Adjustment mechanisms 282 may be disposed at the adjustment ends 278. The adjustment mechanisms 282 may include any of several types of manual or motorized adjustment mechanisms that may increase or decrease the arcs of the first and second seat bottom rods 114, 118, and thereby may adjust the shape of the first and second seat bottom bolsters 30, 34 and the seat bottom center portion 54 adjacent to the first and second seat bottom rods 114, 118. The arcs of the first and second seat bottom rods 114, 118 may be adjusted by adjusting their lengths (see, for example, length $l_1$ of seat bottom rod 114 in the first or extended position 286 in FIG. 5A and the length $l_2$ of the seat bottom rod 114 in the second or retracted position 290 in FIG. 5B). Thus, a decrease in the seat bottom rod length l between the anchor end 270 and the adjustment end 278 from $l_1$ (FIG. 5A) to $l_2$ (FIG. 5B) may decrease the arc height h of the seat bottom rod from $h_1$ (FIG. 5A) to $h_2$ (FIG. 5B).

With continued reference to FIG. 5, in various embodiments, the pockets 216 may be listing pockets, and the first and second seat bottom rods 114, 118 may be listing rods. As such, the adjustment mechanisms 282 may provide for horizontal movement (arrow 294) or rotational movement (arrow 298) that may increase and/or decrease the arc height h or length l in the first and second listing rods 114, 118 and thus may make the first and second seat bottom bolsters 30, 34 respectively less or more prominent.

With continuing reference to FIG. 5, first and second seat bottom rods 114, 118 may impart tension on the seat bottom fabric assembly 102 through the listing pockets 216 and may pull the seat bottom fabric assembly 102 away from the seat bottom seating surface 40 and into the seat bottom 46 to provide the desired contour in the seat bottom surface 40. The tension that the first and second seat bottom rods 114, 118 may exert on the listing pockets 216 and the first and second seams 250, 258 may be changed with the adjustment mechanisms 282, thereby changing the contour of the seat bottom surface 40. In one embodiment, the first and second seat bottom rods 114, 118 may be round fiberglass listing rods. Other profiles and construction materials, however, may also be utilized. For example, flat or U-shaped seat bottom extension member profiles may be constructed from carbon fiber and epoxy resin. As such, the first and second seat bottom rods 114, 118 may allow for convenient alteration of the contour of the seat bottom surface 40 to meet individual needs.

Figure 6:
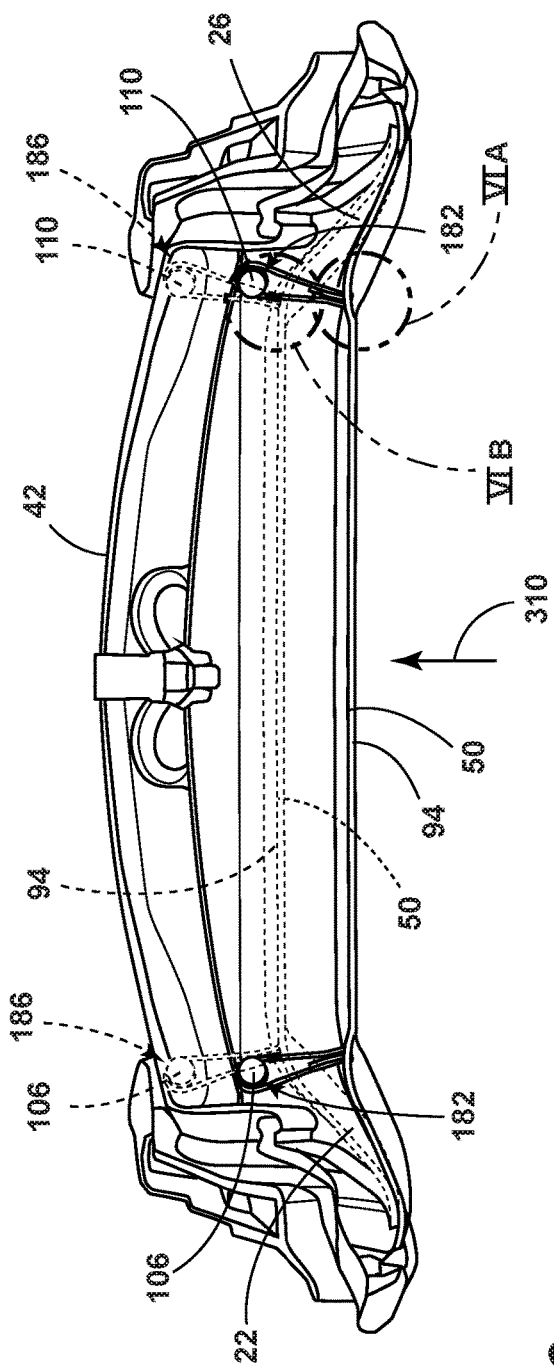
FIG. 6 is a cross-sectional view of the seatback of FIG. 4 taken along VI-VI.

With reference to FIG. 6, a cross-sectional view of the seatback 42 is shown with the first and second seatback rods 106, 110 in the first position 182 (extended position) and the second position 186 (retracted position). The first and second seatback rods 106, 110 may be retracted to increase the tension in the seatback fabric assembly 94 and to pull the seatback fabric assembly 94 into the seatback 42 in the direction shown by arrow 310 to define the first and second seatback bolsters 22, 26.

Figure 6B:
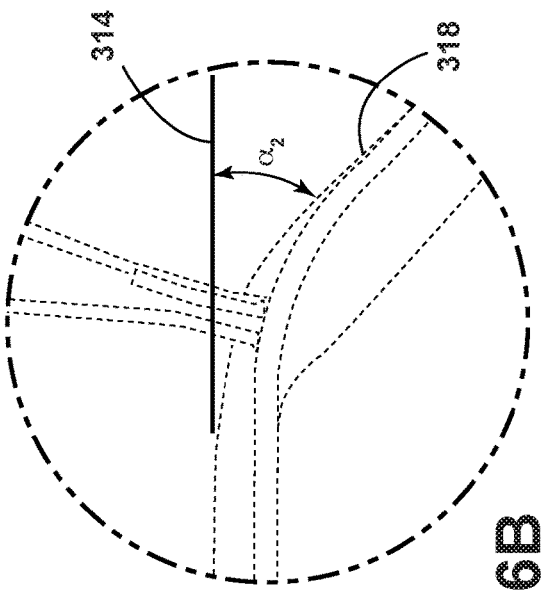
FIG. 6B is a schematic view showing a seatback bolster angle in a second position of a seatback extension member.
Figure 6A:
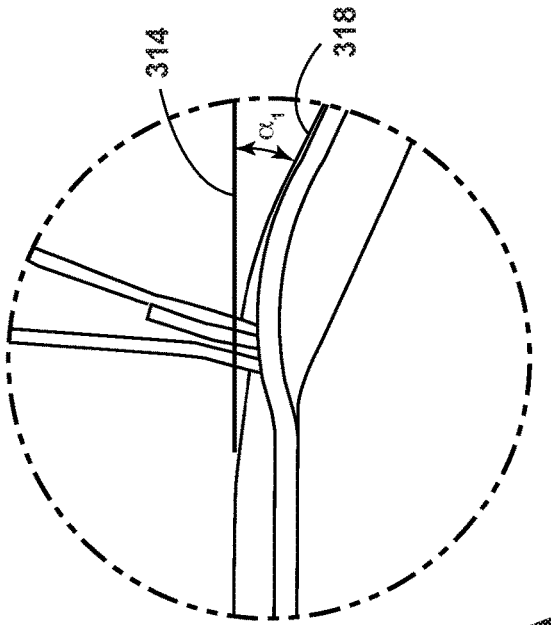
FIG. 6A is a schematic view showing a seatback bolster angle in a first position of a seatback extension member.

With reference to FIGS. 6A and 6B, a seatback bolster angle α may indicate the degree of definition of a first or second seatback bolster 22, 26. The seatback bolster angle α may be defined as the angle between a line 314 generally parallel to the seatback center portion 50 and a line 318 generally parallel to the first seatback bolster 22. FIG. 6A depicts a portion of the seatback fabric assembly 94 in the first position 182 (second seatback rod 110 in extended position). FIG. 6B depicts a portion of the seatback fabric assembly 94 in the second position 186 (second seatback rod 110 in retracted position). A first seatback bolster angle $α_1$ shows the seatback fabric assembly 94 in the first position 182 (second seatback rod 110 in extended position). A second seatback bolster angle $α_2$ shows the seatback fabric assembly 94 in the second position 186 (second seatback rod 110 in retracted position). As such, different seatback surface 38 configurations are shown.

Figure 7:
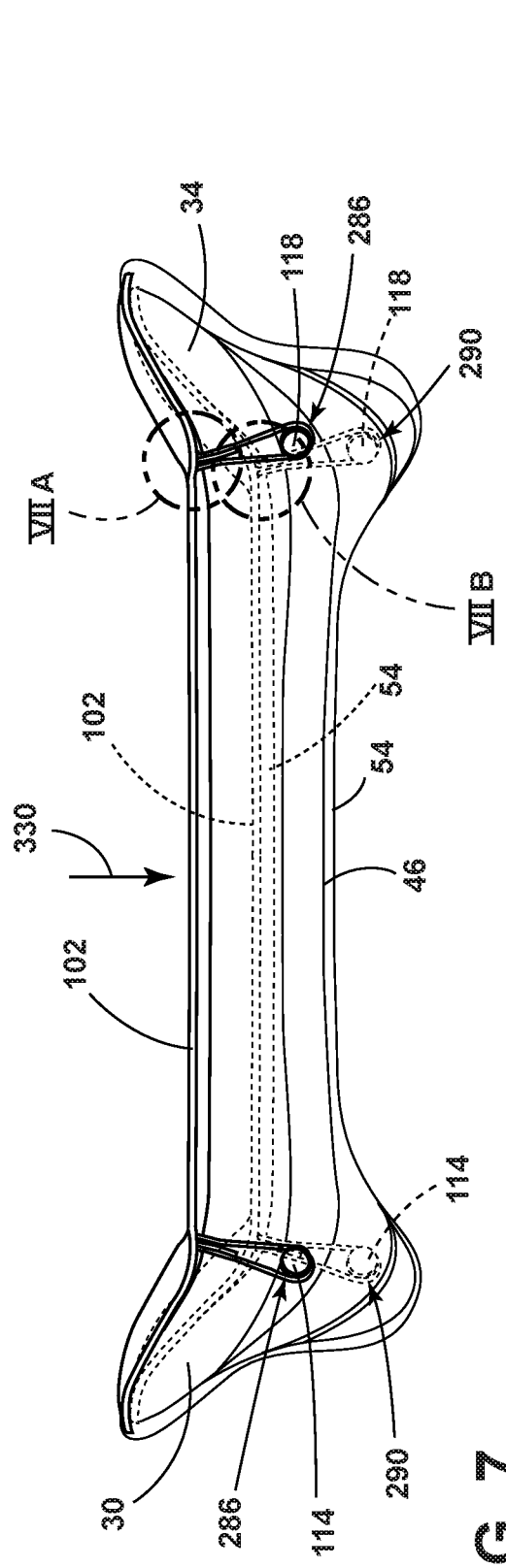
FIG. 7 is a cross-sectional view of the seat bottom of FIG. 5 taken along line VII-VII of FIG. 5.

With reference to FIG. 7, a cross-sectional view of the seat bottom 46 is shown with the first and second seat bottom rods 114, 118 in the first position 286 (extended position) and the second position 290 (retracted position). The first and second seat bottom rods 114, 118 may be moved in a seat bottom direction shown by arrow 330 to increase the tension in the seat bottom fabric assembly 102 and to pull the seat bottom fabric assembly 102 into the seat bottom 46 to define the first and second seat bottom bolsters 30, 34.

Figure 7B:
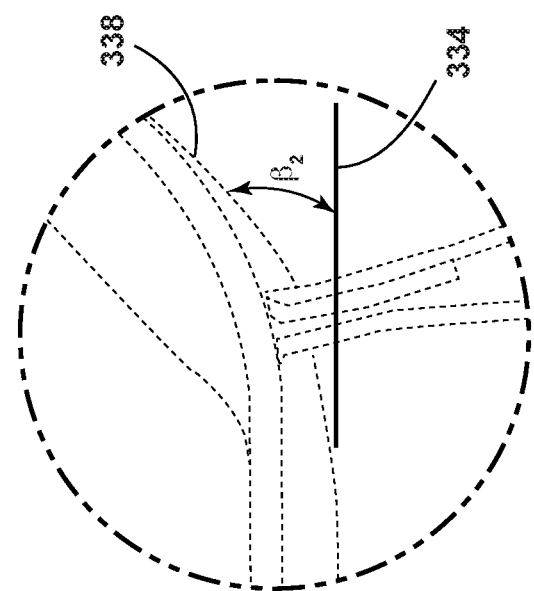
FIG. 7B is a schematic view showing a seat bottom bolster angle in a second position of a seat bottom extension member.
Figure 7A:
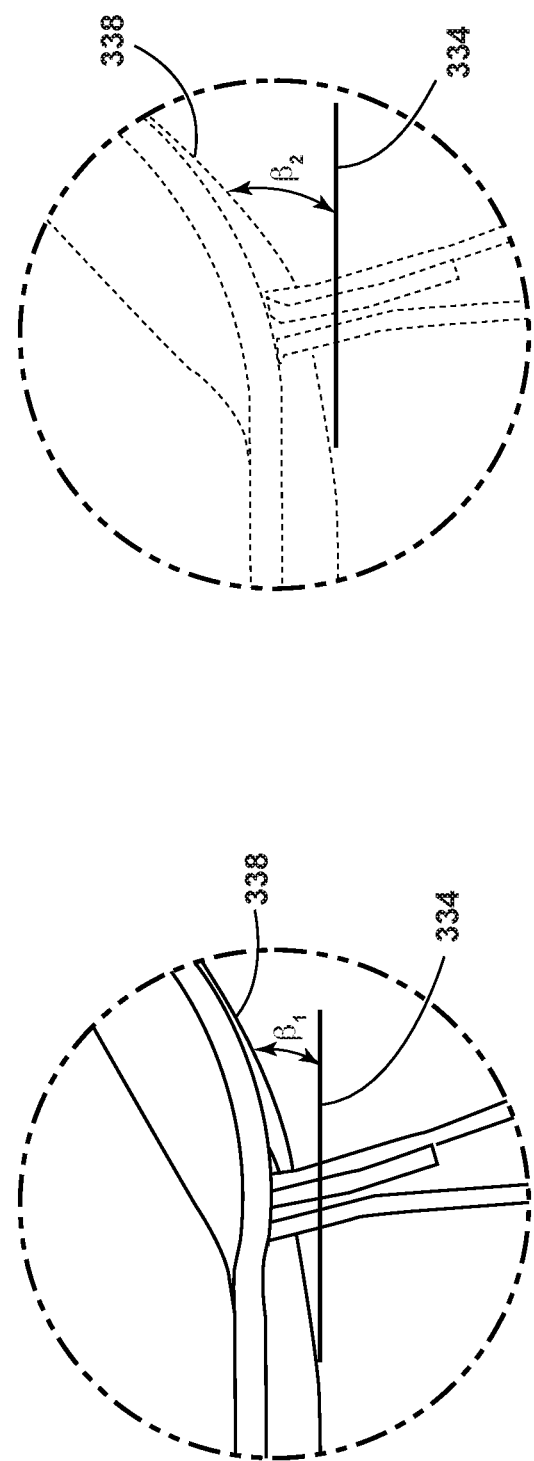
FIG. 7A is a schematic view showing a seat bottom bolster angle in a first position of a seat bottom extension member.

With reference to FIGS. 7A and 7B, a seat bottom bolster angle β may indicate the degree of definition of a first or second seat bottom bolster 30, 34. The seat bottom bolster angle β may be defined as the angle between a line 334 generally parallel to the seat bottom center portion 54 and a line generally parallel to the second seat bottom bolster 34. FIG. 7A depicts a portion of the seat bottom fabric assembly 102 in the first position 286 (second seat bottom rod 118 in extended position). FIG. 7B depicts a portion of the seat bottom fabric assembly 102 in the second position 290 (second seat bottom rod 118 in retracted position). A first seat bottom bolster angle $β_1$ shows the seat bottom fabric assembly 102 in the first position 286 (second seat bottom rod 118 in an extended position). A second seat bottom bolster angle $β_2$ shows the seat bottom fabric assembly 102 in the second position 290 (second seat bottom rod 118 in a retracted position). As such, different seat bottom surface 40 configurations are shown.

Turning now to the attachment of the seatback and seat bottom fabric assemblies 94, 98 to the seatback and seat bottom rods 106, 110 and 114, 118, respectively, the listing pockets 216 may have various configurations. Referring to FIGS. 8-11, an embodiment of a sewn listing pocket assembly 350 is shown. Listing pockets 216a in the sewn listing pocket assembly 350 may be made of a sewn construction. With reference to FIGS. 8 and 9, the listing pockets 216a are shown proximate the first seatback longitudinal panel 130 and the seatback center portion 50. Though FIGS. 8-11 show the sewn listing pocket assembly 350 joining the first seatback longitudinal panel 130 and the seatback center portion 50, the sewn listing pockets assembly 350 may join any fabric pieces of the seatback fabric assembly 94 and/or the seat bottom fabric assembly 102. In the depicted embodiment, the sewn listing pocket assembly 350 may include the first seatback longitudinal panel 130, the seatback center portion 50, and a seam support 354 disposed between the first seatback longitudinal panel 130 and the seatback center portion 50, and the listing pocket 216a. The listing pocket 216a may include a loop 358 with a first pocket edge 362 disposed on the first seatback longitudinal panel 130 and a second pocket edge 366 disposed on the seatback center portion 50. The seam support 354 may be made of a non-woven fabric. The listing pocket 216a may be made of a non-woven fabric.

Referring to FIG. 10, a side view of the sewn listing pocket assembly 350 is shown. The side view includes the first seatback longitudinal panel 130, the seam support 354, and the listing pocket 216a. The first seatback listing rod 106 extends through the listing pocket 216a. As previously stated, the first seatback listing rod 106 may be fiberglass.

Referring to FIG. 11, a cross-sectional view of the sewn listing pocket assembly 350 taken along line XI-XI of FIG. 10 shows stitched join seams 370. The stitched join seams 370 may be sewn. The stitched join seams 370 may hold in place the sewn listing pocket assembly 350 including the first and second pocket edges 362, 366 on the outside, the first seatback longitudinal panel 130 and the seatback center portion 50, and the fabric seam support 354. The first seatback listing rod 106 is shown in the listing pocket 216a. Accordingly, a sewn construction for the sewn listing pocket assembly 350 may be achieved.

With reference to FIGS. 12-15, an embodiment of an overmolded listing pocket assembly 380 is shown. The overmolded listing pocket assembly 380 may include the first seatback longitudinal panel 130, the seatback center portion 50, the retainer part 184 retaining the first seatback longitudinal panel 130 and the seatback center portion 50, and a molded listing pocket 216b. The retainer part 184 may be made of plastic. The molded listing pocket 216b may be injection molded. With reference to FIGS. 12 and 13, the first seatback longitudinal panel 130 and the seatback center portion 50 may be disposed on either side of a retainer part 184. Though FIGS. 12-13 show an overmolded listing pocket assembly 380 joining the first seatback longitudinal panel 130 and the seatback center portion 50, an overmolded listing pocket assembly 380 may join any fabric pieces in the seatback fabric assembly 94 and/or the seat bottom fabric assembly 102. An overmolded listing pocket 216b may extend from the retainer part 184. The first seatback listing rod 106 may extend through an overmolded listing pocket 216b. As previously stated, the first seatback listing rod 106 may be fiberglass.

Referring to FIG. 14, the retainer part 184 is shown with the first seatback longitudinal panel 130 protruding from the retainer part 184. The molded listing pocket 216b is shown attached to retainer part 184. The first seatback listing rod 106 is disposed in the injection molded listing pocket 216b.

With reference to FIG. 15, a cross-sectional view of the overmolded listing pocket assembly 380 taken along line XV-XV of FIG. 14 is shown. In some embodiments, the listing pocket 216b and the retainer part 184 may be overmolded over the first seatback longitudinal panel 130 and the seatback center portion 50. A stitched French seam 392 may be disposed through the molded portions, the first seatback longitudinal panel 130, and the seatback center portion 50. As such, the overmolded listing pocket assembly 380 may be achieved.

Figure 16:
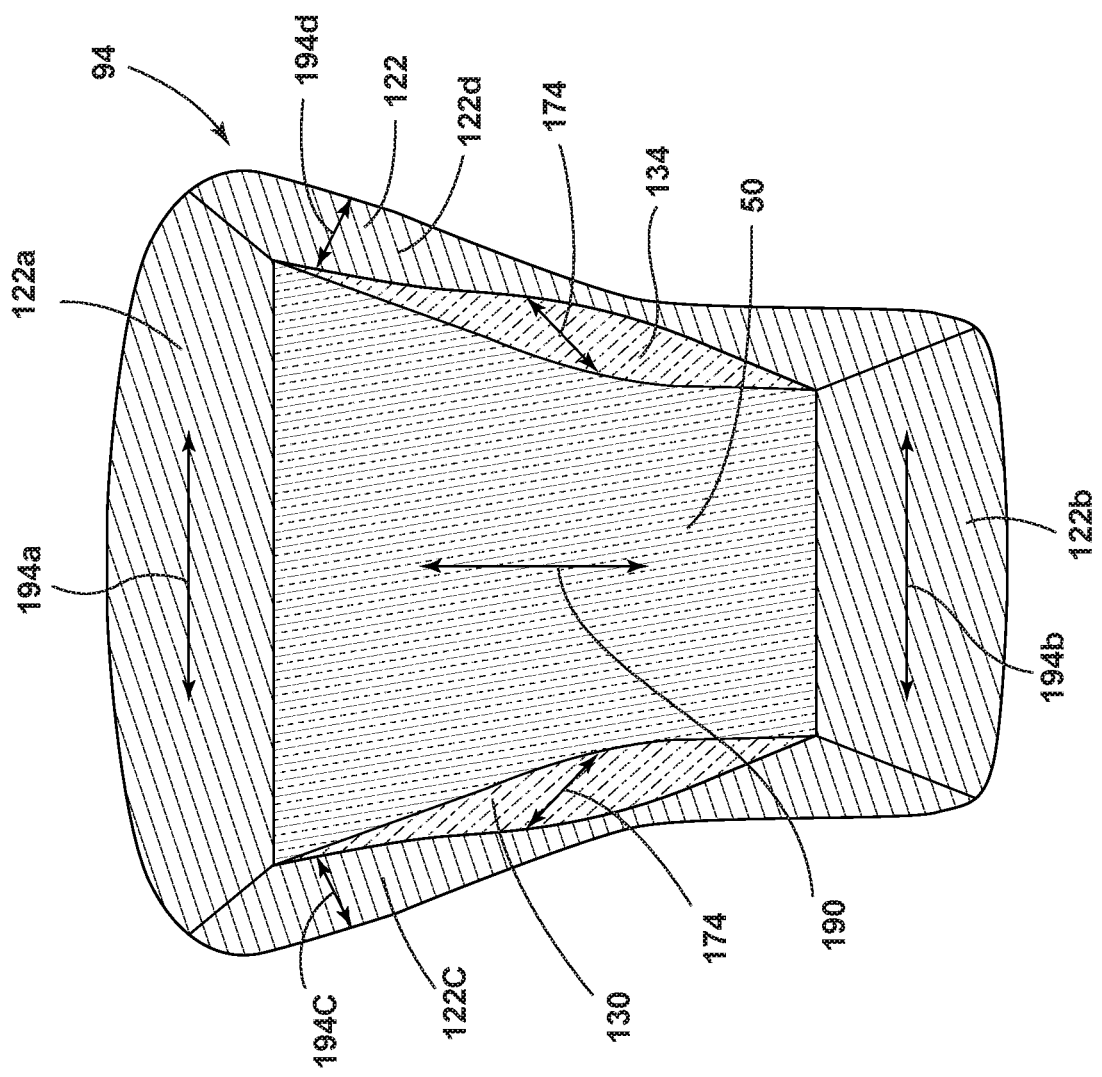
FIG. 16 is a schematic front elevational view of an embodiment of a seatback fabric assembly.

FIG. 16 shows an alternate embodiment of the seatback fabric assembly 94 shown in FIG. 3. Seatback fabric assembly 94a includes additional fabric sections in the border area 122 or portion. The additional fabric sections may include an upper portion 122a, a lower portion 122b, a first side portion 122c, and a second side portion 122d. The upper portion 122a may have a stretch direction depicted by arrow 194a. The lower portion 122b may have a stretch direction depicted by arrow 194b. The first side portion 122c may have a stretch direction depicted by arrow 194c, and the second side portion 122d may have a stretch direction depicted by arrow 194d. The upper portion 122a may include a top facing pattern. The lower portion 122b may include a bottom facing pattern. The first side portion 122c may include a first side facing pattern. The second side portion 122d may include a second side facing pattern.

Figure 17:
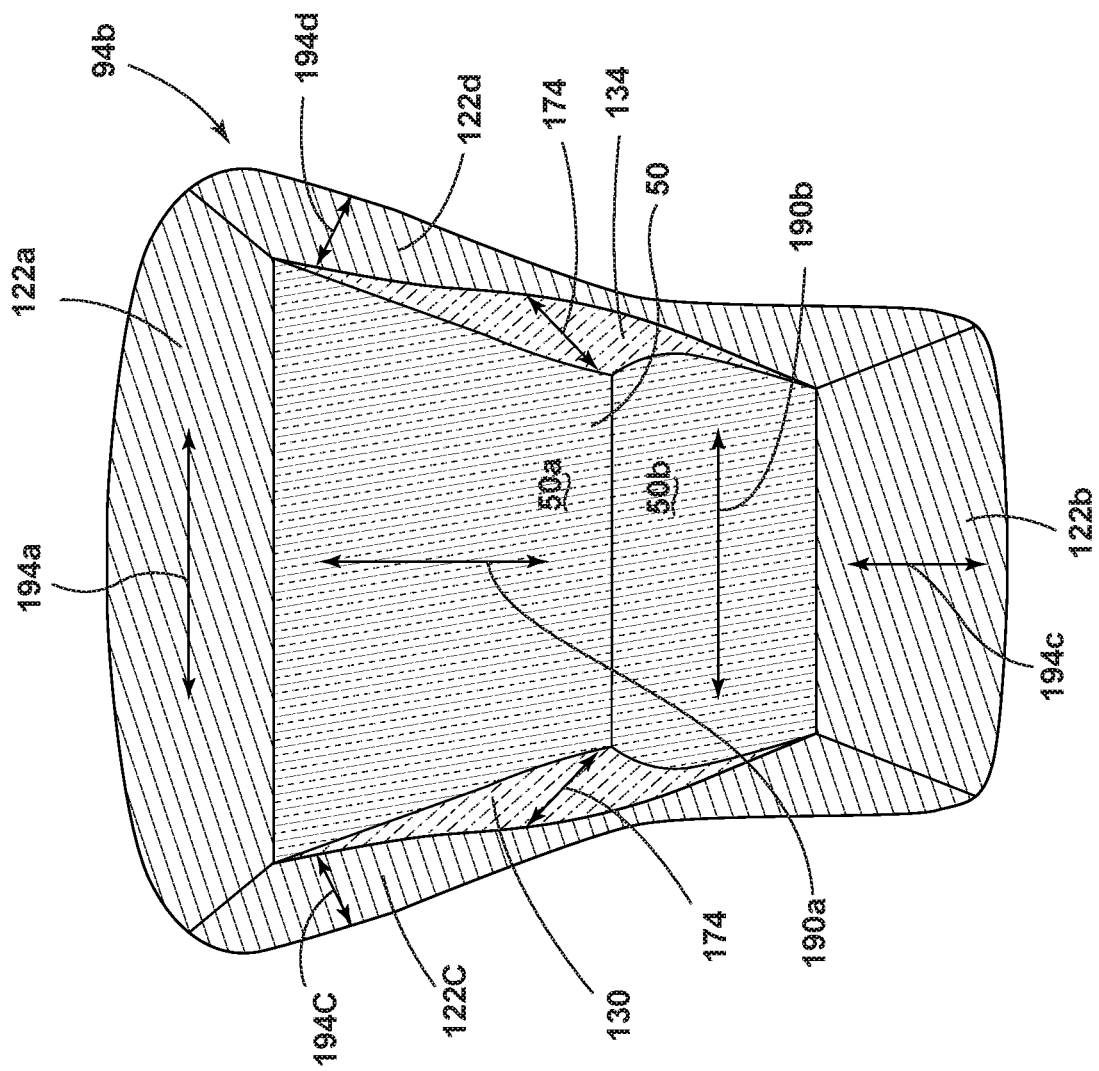
FIG. 17 is a schematic front elevational view of an embodiment of a seatback fabric assembly.

Referring now to FIG. 17, an additional alternate embodiment of the seatback fabric assembly 94 of FIG. 3 is shown. The seatback fabric assembly 94b of FIG. 17 may include an additional fabric section. The seatback center portion 50 of the second seatback fabric assembly 94b may be divided into an upper central portion 50a and a lower central portion 50b. The upper central portion 50a may have a stretch direction depicted by arrow 190a. The lower central portion 50b may have a stretch direction depicted by arrow 190b. The upper central portion 50a may include an insert pattern. The lower central portion 50b may include a lumbar pattern. As such, the various seatback fabric assemblies 94, 94a, 94b shown in respective FIGS. 3, 16, and 17 illustrate different stretch characteristics and outer appearances of different areas of a contoured seatback surface 38.

Referring now to FIGS. 1-17, the first and second seatback rods 106, 110 may be referred to as first and second adjustable members 106, 110. The third edge 233 of the seatback frame 90 may be referred to as a first support 233, and the fourth edge 234 of the seatback frame 90 may be referred to as a second support 234. Similarly, the first and second seat bottom rods 114, 118 may be referred to as first and second adjustable members 114, 118. The third edge 283 of the seat bottom frame 98 may be referred to as a first support 283, and the fourth edge 284 of the seat bottom frame 98 may be referred to as a second support 284.

With further reference to FIGS. 1-17, a vehicle seating assembly 10 may include a seatback 42 having first and second supports 233, 234 and a respective adjustable member 106 or 110 disposed between the first and second supports 233, 234. The adjustable member 106 or 110 may be movable between a first position 182 and a second position 186 to form a respective bolster 22 or 26 between the adjustable member 106 or 110 and the first or second support 233, 234. A seatback fabric assembly 94 may be disposed on the seatback 42 and coupled to the first and second supports 233, 234 and the adjustable member 106 or 110.

With continued reference to FIGS. 1-17, a vehicle seating assembly 10 may include a seat bottom 46 having first and second supports 283, 284 and a respective adjustable member 114 or 118 disposed between the first and second supports 283, 284. The adjustable member 114 or 118 may be movable between a first position 286 and a second position 290 to form a respective bolster 30 or 34 between the adjustable member 114 or 118 and the first or second support 283, 284. A seat bottom fabric assembly 102 may be disposed on the seat bottom 46 and coupled to the first and second supports 283, 284 and the adjustable member 114 or 118.

It is contemplated that the first and second seatback rods 106, 110 may be extended or retracted to form the first and second seatback bolsters 22, 26 that are different sizes (i.e., have different seatback bolster angles α). For example, an individual 78 may desire greater right side shoulder 66 and torso 70 support than left side shoulder 66 and torso 70 support. To provide greater support on the right side of the seatback 42, the seatback 42 may be configured to have a larger right side seatback bolster 22 and a smaller left side seatback bolster 26. Accordingly, the right and/or left seatback rods 106, 110 may be adjusted to achieve a larger right side seatback bolster 22 than a left side seatback bolster 26.

Similarly, the first and second seat bottom rods 114, 118 may be extended or retracted to form the first and second seat bottom bolsters 30, 34 that are different sizes (i.e., have different seat bottom bolster angles β). For example, an individual may desire greater right side thigh 74 support than left side thigh 74 support. To provide greater support on the right side of the seat bottom 46, the seat bottom 46 may be configured to have a larger right side seat bottom bolster 30 and a smaller left side seat bottom bolster 34. Accordingly, the right and/or left seat bottom rods 114, 118 may be adjusted to achieve a larger right side seat bottom bolster 22 than a left side seat bottom bolster 26.

It is to be understood that each of the four bolsters (first and second seatback bolsters 22, 26 and first and second seat bottom bolsters 30, 34) may be different sizes (i.e., have varying respective bolster angles α and β) and may be arranged in a multitude of configurations to suit individual preferences.

It is also to be understood that in various embodiments the designs of the seatback extension members and the seat bottom extension members may include attachment to the respective seatback or seat bottom frames 90, 98 and/or additional vehicle components. For example, the seat bottom extension member anchor end 270 and/or adjustment end 278 may be secured to a vehicle floor 62.

It is to be further understood that in various designs the seatback extension members and the seat bottom extension members may be attached to the respective seatback or seat bottom frames 90, 98 or other vehicle structure to form bolsters that extend transverse to (as opposed to longitudinal to, as shown in FIG. 1) the shoulders 66, torso 70, and/or thighs 74 of an individual 78. Additionally, in various designs the seatback extension members and the seat bottom extension members may be positioned in positions additional to a longitudinal orientation or a latitudinal orientation relative to a seated individual 78. For example, the seatback extension members and the seat bottom extension members may be positioned diagonal to the torso 70 and/or thighs 74 of a seated individual.

Figure 18:
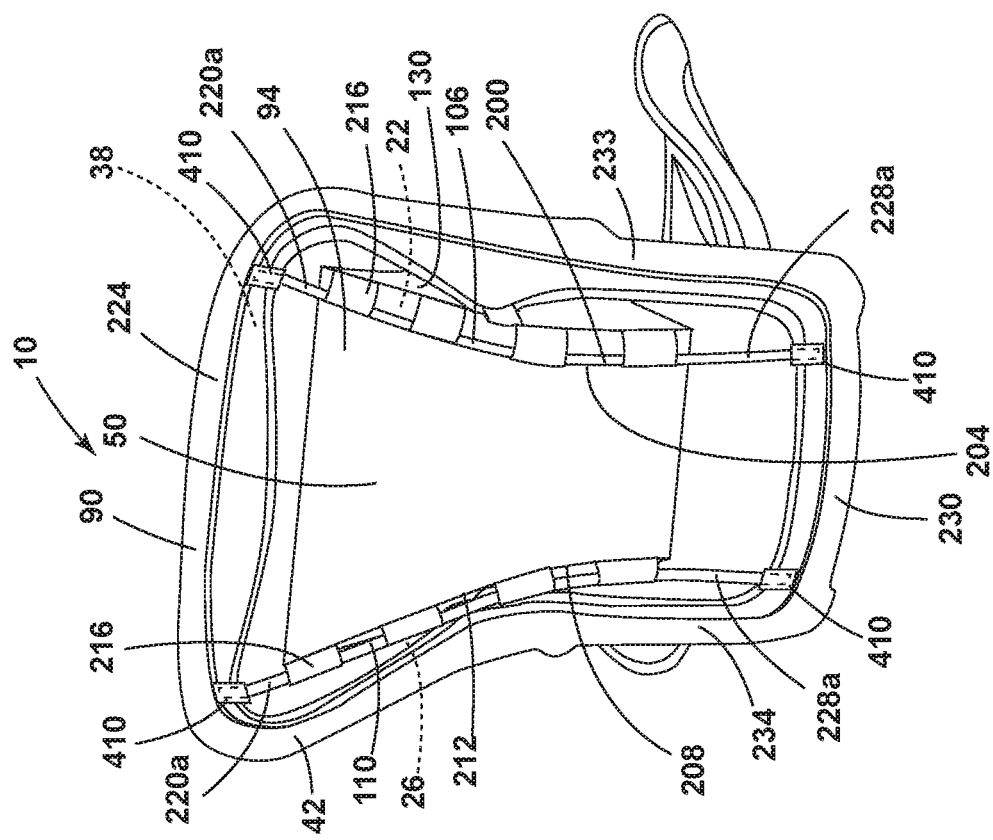
FIG. 18 is a back perspective view of an embodiment of the seatback with anchored rods.

In various embodiments and with reference to FIG. 18, the lengths of the first and second seatback rods 106, 110 may be fixed. Retainers 410 may be disposed at the ends 220a, 228a of the first and second seatback rods 106, 110. In operation, the first and second seatback rods 106, 110 may be bent and inserted into the retainers 410 to form respective first and second seatback bolsters 22, 26. As such, first and second seatback bolsters 22, 26 may be permanent bolsters.

Figure 19:
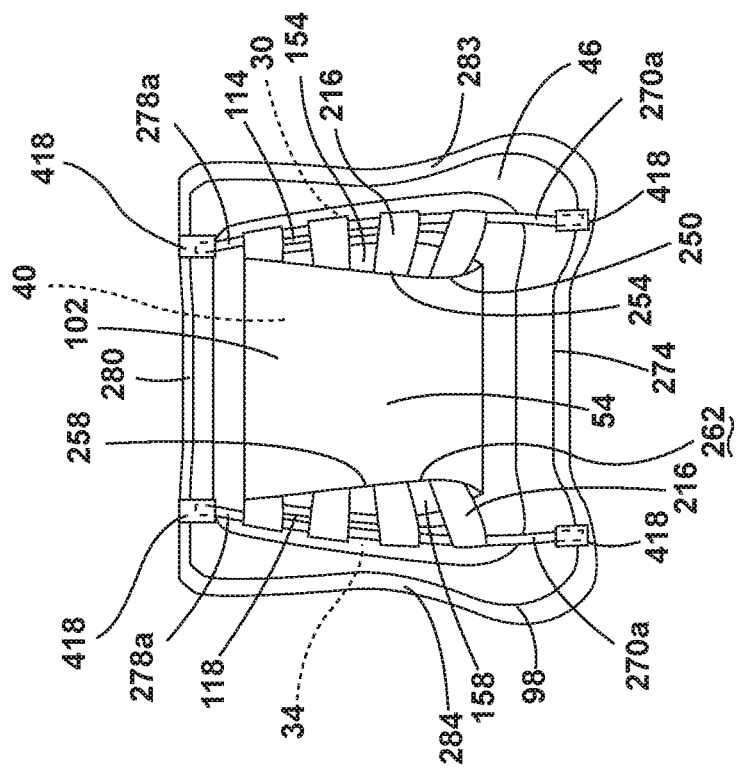
FIG. 19 is a bottom elevational view of an embodiment of the seat bottom with anchored rods.

Similarly, in various embodiments and with reference to FIG. 19, the lengths of the first and second seat bottom rods 114, 118 may be fixed. Retainers 418 may be disposed at the ends 270a, 278a of the first and second seat bottom rods 114, 118. In operation, the first and second seat bottom rods 114, 118 may be bent and inserted into the retainers 418 to form respective first and second seat bottom bolsters 30, 34. As such, first and second seat bottom bolsters 30, 34 may be permanent bolsters.

Figure 20:
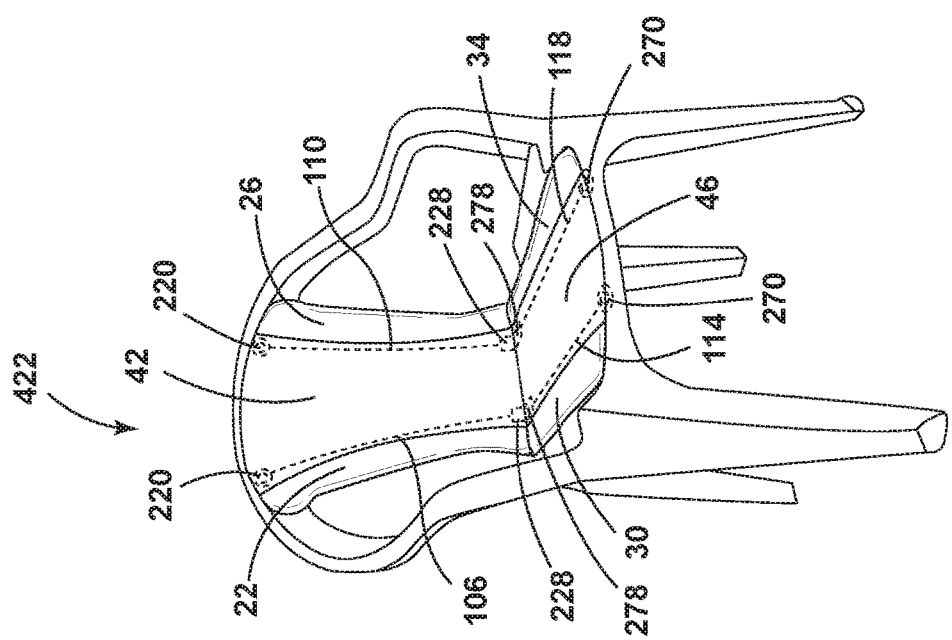
FIG. 20 is a perspective view of a lawn chair with extension members.

Referring now to FIG. 20, an embodiment of the disclosure in a lawn chair 422 is shown. The seatback 42 includes first and second rods 106, 110. In the embodiment shown, the seatback rods 106, 110 include anchor ends 220 and adjustment ends 228. In various embodiments, the first and second seatback rods 106, 110 may be fixed, as shown in FIG. 18. The seat bottom 46 includes first and second seat bottom rods 114, 118. The seat bottom rods 114, 118 include anchor ends 220 and adjustment ends 228. In various embodiments, the first and second seat bottom rods 114, 118 may be fixed, as shown in FIG. 19. As such, in the lawn chair 422, the size of the first and second seatback bolsters 22, 26 and the size of the second seat bottom bolsters 30, 34 may be fixed or adjustable.

Figure 21:
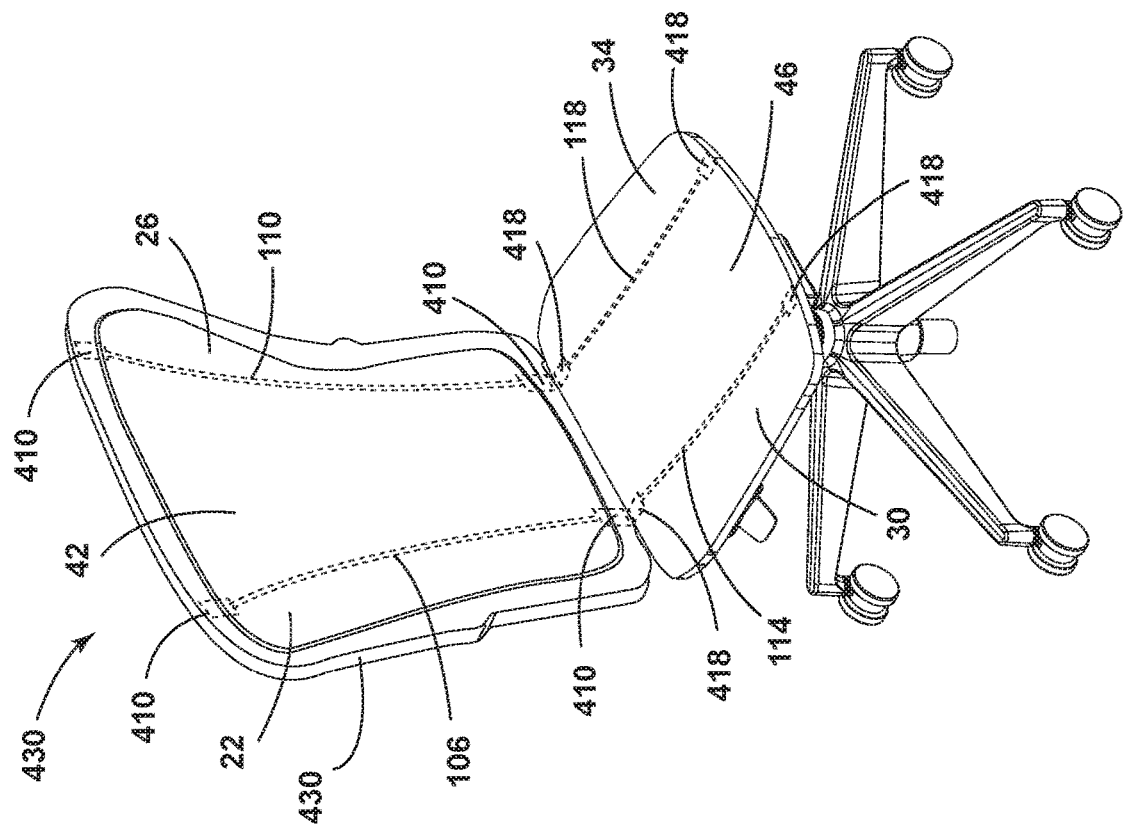
FIG. 21 is a perspective view of an office chair with anchored rods.

Referring now to FIG. 21, an embodiment of the disclosure in an office chair 430 is shown. The seatback 42 includes first and second rods 106, 110. In the embodiment shown, the first and second seatback rods 106, 110 include retainers 410. In various embodiments, the first and second seatback rods 106, 110 of office chair 430 may be adjustable, as shown in FIG. 4. The seat bottom 46 may include first and second seat bottom rods 114, 118. The seat bottom rods 114, 118 may include retainers 418. In various embodiments, the first and second seat bottom rods 114, 118 of office chair 430 may be adjustable as shown in FIG. 5. As such, in the office chair 430, the size of the first and second seatback bolsters 22, 26 and the size of the first and second seat bottom bolsters 30, 34 may be fixed or adjustable.

It is contemplated that the seating assembly 10 disclosed in the present application may be included in single person seats in various locations in a vehicle. It is contemplated that the seating assembly disclosed in the present application may be included in bench and other seat types in a vehicle.

It is contemplated that the seating assembly 10 may include a sling-like or hammock-like configuration wherein the seatback fabric assembly 94 and the seat bottom fabric assembly 102 may be suspended from at least a portion of a respective seatback frame 90 and seat bottom frame 98.

A variety of advantages may be derived from use of the present disclosure. An individual may regulate the seatback contours and the seat bottom contours to suit the preferences of the individual. An individual may find comfort sitting in a seating assembly with a breathable elastomeric fiber.

It is to be understood that variations and modifications can be made on the afore-mentioned structure without departing from the concepts of the present disclosure, and further it is to be understood that such concepts are intended to be covered by the following claims unless these claims by their language expressly state otherwise.

What is claimed is:

1. A vehicle seat comprising:
   a fabric center portion;
   first and second bolsters;
   a first seam between the first bolster and the center portion;
   a second seam between the center portion and the second bolster;
   a seat frame; and
   first and second extension members disposed along and coupled to the respective first and second seams, wherein the first and second extension members are adjustable between retracted and extended positions, wherein in the retracted position the first and second extension members have a first arc size, wherein in the extended position the first and second extension members have a second arc size, and wherein the first arc size is smaller than the second arc size.

2. The vehicle seat of claim 1, further comprising:
a border area disposed within the seat frame and between the center portion and the seat frame, wherein the first and second bolsters comprise respective first and second longitudinal panels.

3. The vehicle seat of claim 2, wherein the first and second seams are disposed between the respective first and second longitudinal panels and the center portion.

4. The vehicle seat of claim 3, wherein the first and second seams each include a pocket and wherein each pocket of the first and second seams is slidably positioned along the respective first and second extension members.

5. The vehicle seat of claim 4, wherein the first and second extension members each include respective first and second anchor ends and wherein the first and second anchor ends are attached to a first edge of the seat frame.

6. The vehicle seat of claim 5, wherein the first and second extension members each include respective first and second adjustment ends, wherein the first and second adjustment ends are attached to a second edge of the seat frame, and wherein the first and second adjustment ends are movable with an adjustment mechanism between the first arc size and the second arc size.

7. The vehicle seat of claim 6, wherein the seat includes a seatback.

8. The vehicle seat of claim 7, wherein the seat includes a seat bottom.

9. The vehicle seat of claim 6, wherein the adjustment mechanism provides horizontal movement to vary the height and the length of the first and second extension members to increase or decrease the size of the arcs of the first and second extension members.

10. The vehicle seat of claim 6, wherein the adjustment mechanism provides rotational movement to vary the height and the length of the first and second extension members to increase or decrease the size of the arcs of the first and second extension members.

11. The vehicle seat of claim 4, wherein the pocket is part of a sewn listing pocket assembly.

12. The vehicle seat of claim 4, wherein the pocket is part of an overmolded listing pocket assembly.

13. The vehicle seat of claim 1, wherein the one or more of the first and second extension members include fiberglass.

14. The vehicle seat of claim 1, wherein the one or more of the first and second extension members include carbon fiber.

15. A seat comprising:
a fabric assembly secured to a seat frame and including a central portion; and
first and second rods each having a fixed length defined by an anchor member disposed on a first edge of a seat frame and an adjustment end disposed on a second edge of the seat frame, wherein the fixed lengths of the first and second rods are each variable between a first length and a second length, wherein the first and second rods are each attached to opposing sides of the central portion, wherein the first and second rods define first and second bolsters on opposing sides of the central portion, wherein the first length is defined by a first arc size, wherein the second length is defined by a second arc size, and wherein the second arc size is smaller than the first arc size.

16. The seat of claim 15, wherein the fabric assembly includes:
first and second panels, wherein the first and second panels partially define the first and second bolsters, wherein the first and second panels are disposed between a first side of the border portion and a first side of a central portion and a second side of the border portion and a second side of the central portion, respectively.

17. The seat of claim 15, wherein the fabric assembly having first and second bolsters is disposed on one or more of a seatback frame and a seat bottom frame.

18. The seat of claim 15, wherein the fabric assembly is subject to greater tension when the first and second rods are at the second arc size than when the first and second rods are at the first arc size.

19. A vehicle seating assembly comprising:
a seatback or a seat bottom having first and second supports;
an adjustable member disposed between the first and second supports and selectively adjustable between a first position having a first arc size and a second position having a second arc size to form a bolster between the adjustable member and the first or second support; and
a fabric assembly disposed on the seatback or the seat bottom and coupled to the first and second supports and the adjustable member, wherein the bolster has a first bolster size when the adjustable member is in the first position, and wherein the bolster has a second bolster size when the adjustable member is in the second position.

20. The vehicle seating assembly of claim 19, wherein the adjustable member comprises first and second listing rods, wherein the bolster comprises first and second bolsters, wherein the selective adjustment of the first listing rod between the first and second positions forms a first bolster in a respective first or second size, and wherein the selective positioning of the second listing rod between the first and second positions forms a second bolster in a respective first or second size.

* * * * *